(12) United States Patent
Herring et al.

(10) Patent No.: US 11,447,120 B2
(45) Date of Patent: Sep. 20, 2022

(54) HEV BATTERY SOC METER AND POWER SPLIT USAGE DISPLAY

(71) Applicant: TOYOTA MOTOR ENGINEERING & MANUFACTURING NORTH AMERICA, INC., Plano, TX (US)

(72) Inventors: Craig D. Herring, Pinckney, MI (US); Aaron M. France, Westland, MI (US)

(73) Assignee: TOYOTA MOTOR ENGINEERING & MANUFACTURING NORTH AMERICA INC, Plano, TX (US)

( * ) Notice: Subject to any disclaimer, the term of this patent is extended or adjusted under 35 U.S.C. 154(b) by 294 days.

(21) Appl. No.: 16/693,202

(22) Filed: Nov. 22, 2019

(65) Prior Publication Data

US 2021/0155220 A1     May 27, 2021

(51) Int. Cl.
    *B60W 20/00*     (2016.01)
    *B60L 58/12*     (2019.01)
    (Continued)

(52) U.S. Cl.
    CPC .............. *B60W 20/00* (2013.01); *B60K 6/46* (2013.01); *B60K 6/48* (2013.01); *B60K 35/00* (2013.01); *B60L 50/10* (2019.02); *B60L 50/66* (2019.02); *B60L 58/12* (2019.02); *B60W 40/12* (2013.01); *B60W 50/14* (2013.01);
    (Continued)

(58) Field of Classification Search
    CPC ...... B60W 20/00; B60W 40/12; B60W 50/14; B60W 2050/146; B60L 50/66; B60L 58/12; B60L 50/10; B60K 6/46; B60K 6/48; B60K 35/00; B60K 2370/167; B60K 2370/152;
    (Continued)

(56) References Cited

U.S. PATENT DOCUMENTS 9,683,875 B2    6/2017    Hackenberg
10,921,145 B2 *    2/2021    Son .................... G01C 21/3492
(Continued)

FOREIGN PATENT DOCUMENTS

CN        110027401 A    *    7/2019   ........... B60L 53/14
DE      102007057548        6/2009
(Continued)

OTHER PUBLICATIONS

Saiful et al., "Influence of Motor Power and Efficiency on Fuel Consumption of Retrofit-Conversion Split-Parallel Hybrid Electric Vehicle," 2013, Publisher: IEEE.*
(Continued)

*Primary Examiner* — Tuan C To
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for presenting in a hybrid electric vehicle display, proximate to or in some relation to each other, engine power usage, motor-generator power usage, and battery state of charge information. By combining the display of engine power usage, motor-generator power, and battery state of charge information, power distribution and related information may be presented to the operator of a vehicle to explain the vehicle's performance from a power split output and usage perspective. This can provide reassurance or confirmation that the vehicle is operating as it should, identify a problematic condition, etc.

18 Claims, 6 Drawing Sheets

(51) Int. Cl.
  *B60K 35/00* (2006.01)
  *B60K 6/46* (2007.10)
  *B60K 6/48* (2007.10)
  *B60L 50/60* (2019.01)
  *B60L 50/10* (2019.01)
  *B60W 40/12* (2012.01)
  *B60W 50/14* (2020.01)

(52) U.S. Cl.
  CPC .. *B60K 2370/152* (2019.05); *B60K 2370/166* (2019.05); *B60K 2370/167* (2019.05); *B60K 2370/168* (2019.05); *B60K 2370/169* (2019.05); *B60K 2370/171* (2019.05); *B60W 2050/146* (2013.01); *B60Y 2200/92* (2013.01)

(58) Field of Classification Search
  CPC ........ B60K 2370/166; B60K 2370/168; B60K 2370/169; B60K 2370/171; B60Y 2200/92
  USPC ......................................................... 701/34.2
  See application file for complete search history.

(56) References Cited

U.S. PATENT DOCUMENTS

| | | | | |
|---|---|---|---|---|
| 2002/0065589 | A1* | 5/2002 | Ostberg | B60W 20/00 701/22 |
| 2008/0125265 | A1* | 5/2008 | Conlon | F16H 3/728 475/5 |
| 2008/0300743 | A1* | 12/2008 | Conlon | B60K 6/40 903/930 |
| 2009/0125173 | A1 | 5/2009 | Komatsu | |
| 2009/0243827 | A1 | 10/2009 | Burke | |
| 2010/0052888 | A1* | 3/2010 | Crowe | B60W 20/00 340/461 |
| 2011/0212802 | A1* | 9/2011 | Conlon | B60W 10/26 475/5 |
| 2014/0277874 | A1* | 9/2014 | Crombez | B60W 20/00 701/22 |
| 2015/0136074 | A1* | 5/2015 | Styles | F02M 26/43 123/320 |
| 2017/0036662 | A1* | 2/2017 | Chen | B60W 20/12 |
| 2019/0178662 | A1* | 6/2019 | Son | B60W 20/12 |
| 2019/0313446 | A1* | 10/2019 | Kim | H04W 74/02 |
| 2020/0235440 | A1* | 7/2020 | Hao | H01M 10/425 |
| 2020/0391721 | A1* | 12/2020 | Wang | B60W 20/12 |

FOREIGN PATENT DOCUMENTS

| | | | | |
|---|---|---|---|---|
| EP | 2371646 | A1 * | 10/2011 | ............... B60K 6/48 |
| EP | 2802475 | | 11/2014 | |
| JP | H06233404 | | 8/1994 | |
| JP | 2019130983 | A * | 8/2019 | |
| JP | 2019130984 | A * | 8/2019 | ............ B60W 10/06 |
| JP | 2019156229 | A * | 9/2019 | ............. B60L 58/16 |
| WO | WO-2008084626 | A1 * | 7/2008 | ............... B60K 6/44 |

OTHER PUBLICATIONS

Jeongmin et al., "Motor-Generator Control of an Electromechanical Variable Transmission for a Hybrid Electric Vehicle," 2006, Publisher: IEEE.*

Zhu-mu et al., "An Improved Logic Threshold Approach of Energy Management for a Power-Split Hybrid Electric Vehicle," 2013, Publisher: IEEE.*

* cited by examiner

HEV BATTERY SOC METER AND POWER SPLIT USAGE DISPLAY

TECHNICAL FIELD

The present disclosure relates generally to determining and displaying battery state of charge (SOC) and power usage split in a hybrid electric vehicle (HEV) in a manner that allows an HEV operator to understand the HEV's power usage.

DESCRIPTION OF RELATED ART

Hybrid vehicles and electric vehicles have become increasingly popular among consumers concerned with their environmental impact and with increasing fuel economy. Hybrid vehicles generally utilize an engine, e.g., an internal combustion engine, along with one or more electric motors, which can also operate as generators to provide energy to a battery that powers the electric motor. Hybrid vehicles can use an engine clutch that connects/disconnects the engine to/from a drivetrain. The drivetrain can include the engine and electric motor, and a transmission coupled to the electric motor for transmitting power from the engine, electric motor, or both.

Electric vehicles utilize only electric motors to provide drive power. Generally, electric vehicles incorporate two electric motors to provide drive power, where a clutch, similar to the engine clutch connects/disconnects one or the other electric motor depending on a desired travel mode. The drivetrain, similar to that of a hybrid vehicle, minus the engine, may include the electric motor(s) and various drive gears.

BRIEF SUMMARY OF THE DISCLOSURE

In accordance with one embodiment of the present disclosure, a method may comprise monitoring current engine-supplied power to a hybrid electric vehicle transmission, and current motor generator-supplied power to the hybrid electric vehicle transmission. The method may further comprise determining a current battery state of charge, and monitoring at least one of current environmental conditions and road conditions impacting amounts of the current engine-supplied power and the current motor generator-supplied power. Further still, the method may comprise presenting hybrid electric vehicle performance and power usage split information comprising the current engine-supplied power and the current motor generator-supplied power relative to the at least one of the current environmental conditions and road conditions impact proximate to a presentation of the current battery state of charge on a display of the hybrid electric vehicle.

In some embodiments, the at least one of the current environmental conditions and road conditions impact is presented as a maximum and minimum available engine-supplied power and as a maximum and minimum available motor generator-supplied power.

In some embodiments, the hybrid electric vehicle comprises a series hybrid electric vehicle. In some embodiments, the series hybrid electric vehicle comprises a single motor generator operatively connected to a transmission of the hybrid electric vehicle. In some embodiments, the series hybrid electric vehicle further comprises an engine operatively connected to the single motor generator in series. In some embodiments, the series hybrid electric vehicle comprises a battery operatively connected to and providing electrical power to the single motor generator.

In some embodiments, the hybrid electric vehicle comprises a parallel hybrid electric vehicle. In some embodiments, the parallel hybrid electric vehicle comprises first and second motor generators operatively connected to the transmission of the hybrid electric vehicle. In some embodiments, the parallel hybrid electric vehicle comprises an engine operatively connected in parallel to one of the first and second motor generators. In some embodiments, the parallel hybrid electric vehicle comprises a battery operatively connected to and providing electrical power to at least one of the first and second motor generators.

In some embodiments, the presentation of the hybrid electric vehicle performance and power usage split information comprising the current engine-supplied power and the current motor generator-supplied power relative to the at least one of the current environmental conditions and road conditions impact is displayed against a background representation of a powertrain of the hybrid electric vehicle. In some embodiments, the powertrain of the hybrid electric vehicle comprises an internal combustion engine operatively connected to at least one motor generator in series.

In accordance with another embodiment, a hybrid electric vehicle may comprise a power display circuit that: monitors engine-supplied power to a transmission relative to engine-supplied available power; monitors motor generator-supplied power to the transmission relative to motor generator-supplied available power; determines a battery state of charge; and monitors operating conditions relating to and operating characteristics of the hybrid electric vehicle impacting amounts of the engine-supplied available power and the motor generator-supplied available power. The hybrid electric vehicle may further comprise a display that: displays power usage split information comprising the engine-supplied power relative to the engine-supplied available power and the motor generator-supplied power relative motor generator-supplied available power; and displays battery state of charge information proximate to the power usage split information.

In some embodiments, the hybrid electric vehicle comprises a series hybrid electric vehicle. In some embodiments, an internal combustion engine generates the engine-supplied power. In some embodiments, a single motor operatively connected in series to the internal combustion engine generates the motor generator-supplied power. In some embodiments, a battery operatively connected to the single motor generators provides electrical power to the single motor generator.

In some embodiments, the display displays the power usage split information relative to a representation of the powertrain of the hybrid electric vehicle.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
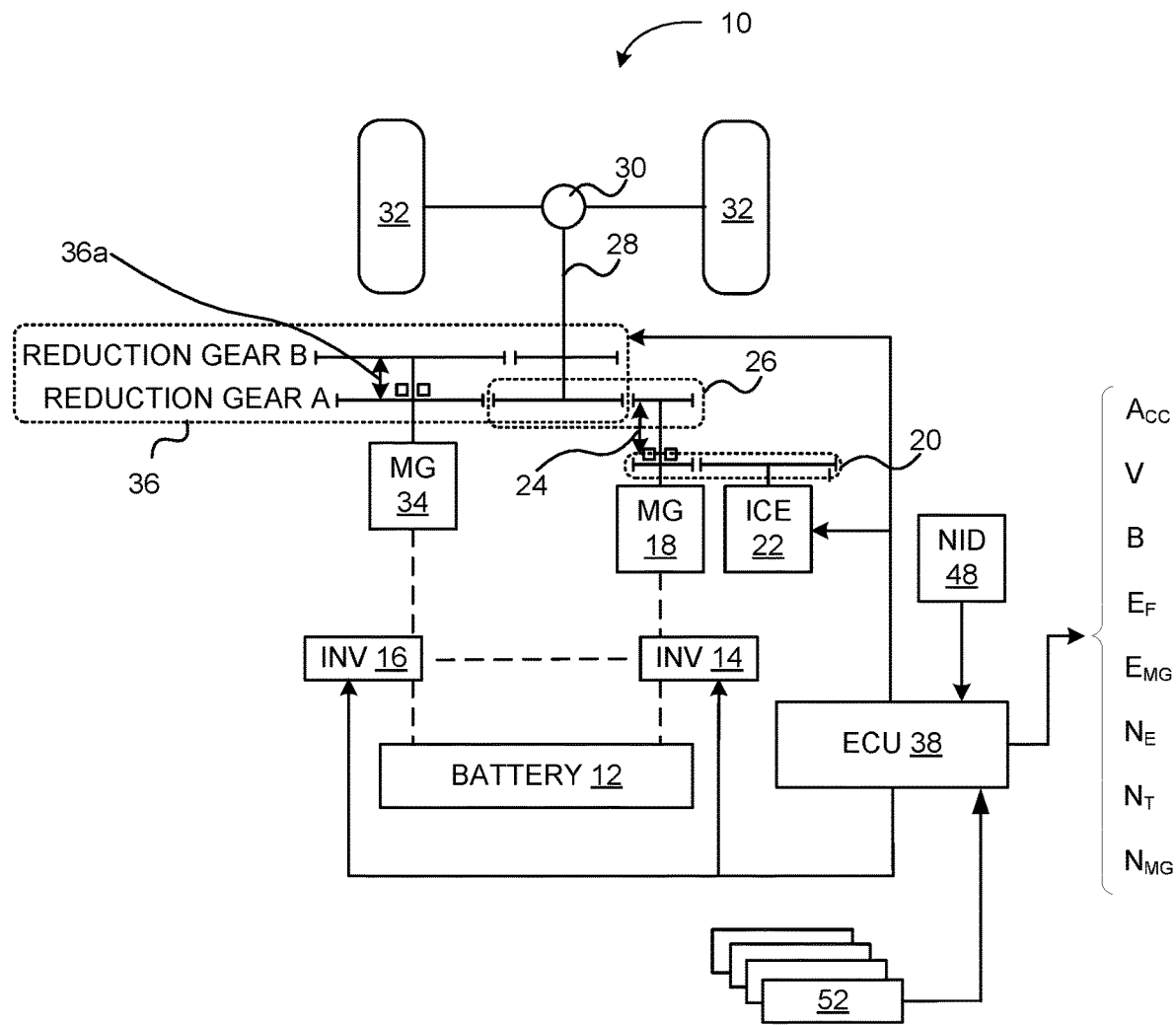
FIG. 1A is a schematic representation of an example dual-motor HEV, the operating conditions of which can be displayed in accordance with various embodiments of the present disclosure.

The figures are not exhaustive and do not limit the present disclosure to the precise form disclosed.

DETAILED DESCRIPTION

Various embodiments of the present disclosure are directed to determining and displaying information regarding certain operating conditions of or relating to an HEV. Such information can include, but is not necessarily limited to battery SOC information and power usage split information regarding both an HEV's engine, such as an internal combustion engine (ICE) and the HEV's one or more motor-generators (MGs).

In conventional HEVs, displays showing ICE and MG usage comprise a combined power display or presentation. In such conventional HEVs, the operator of the HEV will not know the particular power usage split, i.e., the respective amount(s) of power being provided by the ICE and/or the one or more MGs. Moreover, conventional HEV's fail to present information regarding a total available amount of power as it fluctuates due to various environmental conditions, nor do conventional HEV's generally present battery SOC information together with drive power usage information. Without knowing the particular power usage split, the available power, and/or battery SOC, the operator may be confused about the operation of the HEV. For example, if the battery SOC reflects low available battery power, the one or more MGs may be impacted in terms of their ability to provide drive power to the HEV. Absent awareness of the battery SOC and the drive power or energy being provided by the ICE and the MG(s), the operator will not understand why an MG is not able to provide a desired amount of drive power. For example, environmental conditions, such as altitude in which the HEV is operating, the type of fuel being used in the ICE, etc. may also impact operation of the ICE, the one or more MGs, or some combination thereof. Again, without knowing how much power is available or being provided by the ICE and the one or MGs, separately, an operator may not understand why the HEV is operating in a certain manner.

Accordingly, various embodiments can present, proximate to or in some relation to each other, ICE power usage, MG power usage, and battery SOC information. By combining the display of ICE power usage, MG power, and battery SOC, power distribution and related information may be presented to the operator of an HEV to explain the HEV's performance from a power split output and usage perspective. This can provide reassurance or confirmation that the HEV is operating as it should, identify a problematic condition, etc. It should be noted that various embodiments are described in the context of ICE or engine power usage.

However, other embodiments are contemplated wherein positive intake manifold pressure, also referred to as boost pressure, may also be determined/presented much in the same way or in a similar manner to determining/presenting ICE or engine power usage. In other words, the ICE/engine utilized in an HEV may be a naturally aspirated engine, or it may be turbocharged or supercharged, in which case, boost pressure may also be presented to a user/operator of an HEV, where the boost pressure is indicative of the positive intake manifold pressure provided through use of a turbocharger or supercharger. By contrast, naturally aspirated engines traditionally have a vacuum in the intake manifold allowing such engines to rely on cylinder movement to pull air into the engine (as opposed to being forced in vis-à-vis a turbocharger/supercharger).

In some embodiments, an HEV in and for which, power usage split and battery SOC information is displayed may be a series HEV. A series HEV may be equipped with an engine, e.g., ICE, a first MG, and a second MG. The series HEV may have a first power transmission mechanism that engages the engine with the first MG. The series HEV may further include a second power transmission mechanism that engages the first MG with a vehicle drive shaft. The series HEV may have a clutch that is capable of engaging the first MG with one of the first power transmission mechanism and the second power transmission mechanism in a switching manner. Further still, the series HEV may comprise a transmission that switches between transmission gear ratios and engages the second MG with the vehicle drive shaft.

In some embodiments, the series HEV may further include a controller that changes travel modes by switching engagement states of the clutch and the transmission. Travel modes can include, but are not limited to EV travel mode 1 in which the vehicle travels using one of the first MG and the second MG. A second EV travel mode 2 may exist in which the vehicle travels using both the first MG and the second MG. A series HEV may also operate under an engine power generation mode in which the vehicle travels using the second MG while the engine and the first MG generate electric power, or a regeneration mode in which one or both of the first MG and the second MG regenerate electric power.

FIG. 1A shows a structure of an example HEV, i.e., HEV 10, according to one embodiment. It should be understood that the structure of HEV 10 is only one example of an HEV in which various embodiments of the present disclosure may be implemented to present power usage split and battery SOC information. HEV 10 may include a battery 12. Battery 12 may be a Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply, and can be a high-output and high-capacity battery.

Battery 12 may be electrically connected to a first inverter 14 and a second inverter 16. The first and second inverters, 14 and 16, convert DC power from the battery 12 to desired AC power. For example, positive and negative bus bars respectively connected to a positive electrode and a negative electrode of the battery 12 have three arms connected therebetween. Each arm may have two switching elements arranged thereon, and a three-phase output is obtained from a midpoint of the three arms by controlling switching of the six switching elements. It is also possible to convert AC power input from the midpoint of the three arms to DC power by controlling switching of the switching elements, and supplying the DC power to the battery 12.

The first inverter 14 may be electrically connected to a first MG 18. By controlling the first inverter 14, it is possible not only to drive the first MG 18 to output (drive) power, but electric power can be supplied to the battery 12, the electric power being generated by the first MG 18.

The drive shaft of the first MG 18 is connected to a first reduction gear 20 that is a first power transmission mechanism (for "normal" travel), and this first reduction gear 20 is connected to a drive shaft of an ICE 22. By driving ICE 22, it is possible to drive the first MG 18 via the first reduction gear 20 to generate electric power. By supplying the generated electric power to the battery 12 via the first inverter 14, the battery 12 can be charged. It should be understood that a mechanical connection between the first motor generator 18 and ICE 22 may be cut off to disengage operation of MG 18 and ICE 22 from each other.

The drive shaft of the first MG 18 may be connected to a second reduction gear 26 (that is a second power transmission mechanism for "high-speed" travel) via a clutch 24. The second reduction gear 26 is connected to the vehicle drive shaft 28. The drive power provided by the first MG 18 can be transmitted to the vehicle drive shaft 28 via the second reduction gear 26 by connecting the clutch 24 to the second reduction gear 26. It is also possible to generate electric power in the first MG 18 by transmitting power from the vehicle drive shaft 28 to the first MG 18. The vehicle drive shaft 28 can be connected to wheels 32 via a differential gear 30, where the drive power of the vehicle drive shaft 28 causes wheels 32 to rotate allowing HEV 10 to move/travel. Further, HEV 10 can leverage regenerative braking by generating power using the power of the vehicle drive shaft 28 generated by the rotation of wheels 32.

A second inverter 16 may be electrically connected to a second MG 34. Similar to the operation of first MG 18, by controlling the second inverter 16, it is possible to drive the second MG 34 to output power as well as supply electric power to the battery 12. The electric power generated can be generated by the second MG 34.

The drive shaft of the second MG 34 may be connected to a transmission 36. The transmission 36 may include a clutch 36a which enables switching of a transmission gear ratio between two stages, reduction gear ratio A and reduction gear ratio B. The transmission 36 is connected to the vehicle drive shaft 28. By connecting the clutch 36a to either the reduction gear ratio A or B side, the drive power generated/provided by the second MG 34 can be transmitted to the vehicle drive shaft 28 according to reduction gear ratio A or B. Furthermore, by transmitting power from the vehicle drive shaft 28 to the second MG 34, electric power can be generated in the second MG 34, thereby regeneratively braking the vehicle. The clutch 36a may also be set to a neutral position that disengages second MG 34 from vehicle drive shaft 28.

HEV 10 may further comprise a controller 38. Controller 38 not only controls a clutch 24 and transmission 36, but also controls the driving of first MG 18, second MG 34, and ICE 22, in order to implement various travel modes depending on the state of HEV 10. In other words, and as alluded to above, HEV 10 can utilize one or more of a plurality of power sources. The power sources include ICE 22 that is used to generate electric power may be, for example, a gasoline, diesel or similarly powered engine in which fuel is injected into and combusted in a combustion chamber. Another power source includes first MG 18 that generates electric power mainly using the output of ICE 22. Yet another power source comprises second MG 34. Second MG 34, in some embodiments, can mainly be used to drive HEV 10.

HEV 10 further comprises speed reduction and speed change devices including e.g., first reduction gear 20 that engages ICE 22 with first MG 18 at a fixed reduction gear ratio, as well as second reduction gear 26 that engages first MG 18 with the vehicle drive shaft 28 at a fixed reduction gear ratio. HEV 10 further comprises a clutch 24 that achieves one of three states of operation: the drive shaft of the first MG 18 engaged with the first reduction gear 20; the drive shaft of the first MG 18 engaged with the second reduction gear 26; and the drive shaft of the first MG 18 not engaged with either the first reduction gear 20 or the second reduction gear 26 (neutral). Still another speed reduction/change device includes the aforementioned transmission 36 that engages the drive shaft of the second MG 34 with the vehicle drive shaft 28 at two or more different types of transmission gear ratios.

Electronic control unit (ECU) 38 may control operation of ICE 22, first and second MGs 18 and 23, clutches 24 and 26a, transmission 36, etc. to effectuate different travel modes. In accordance with a first EV travel mode, the vehicle travels using one of the first MG 18 and the second MG 34. In a "normal state" of the first EV travel mode, clutch 24 connects an output shaft of the first MG 18 to vehicle drive shaft 28 via reduction gear 26. The transmission 36 is set to neutral because it does not transmit power. ICE 22 and the second MG 34 stop, and the first MG 18 is driven by electric power from the battery 12 (which is in a discharging state) via the first inverter 14, and the drive power of the first MG 18 is transmitted to the wheels 32.

In accordance with another "normal state" of the first EV travel mode, second MG 34 provides the drive power, and relies on reduction gear ratio A, where the clutch 24 is set to the neutral position (or connects the output shaft of the first MG 18 to ICE 22 via the reduction gear 20). The transmission 36 has the reduction gear ratio A which is a larger reduction gear ratio. ICE 22 and the first MG 18 stop, and the second MG 34 is driven by electric power from the battery 12 (which again is in a discharging state). Thus, electric power from the battery 12 is supplied to the second MG 34 via the second inverter 14, and the drive power of the second MG 34 is changed in speed according to the reduction gear ratio A in the transmission 36, and transmitted to the wheels 32.

In accordance with a "high-speed state" of the first EV travel mode, transmission 36 uses the reduction gear ratio B which is a smaller reduction gear ratio. Operation is similar to that of the normal state travel mode, merely relying on a different reduction gear ratio. Higher speed travel becomes possible using the drive power of the second MG 34.

It should be understood that there is relationship between torque of the vehicle drive shaft 28 using the transmission 36 and the vehicle speed. Assume that the vehicle speed at which torque of the vehicle drive shaft 28 according to the reduction gear ratio A and the reduction gear ratio B are identical is V1. When the vehicle speed is less than V1, the reduction gear ratio A is used, and when the vehicle speed is V1 or greater, the reduction gear ratio B is used. Compared to situations where a single reduction gear ratio (reduction gear ratio A or reduction gear ratio B) is used, it becomes possible to make drive shaft torques larger at all vehicle speeds, thereby improving acceleration performance of HEV 10. Furthermore, the second MG 34 has a larger output than the first MG 18. Accordingly, in normal driving, the second MG 34 is used more often to drive HEV 10. However, when relatively low output continues, the first MG 18 enables more efficient driving than the second MG 34. Thus, the supply of drive power may be switched between first MG 18 and the second MG 34, depending on which MG enables more efficient operation of HEV 10

In accordance with a second EV travel mode, first and second MGs 18 and 34 are used to provide drive power. HEV 10 travels using both the first MG 18 and the second MG 34. This mode is used when an acceleration request is high, and a requested output torque is large, or when more efficient traveling is possible compared to the case where HEV 10 travels using a single MG. Clutch 24 connects the drive shaft of the first MG 18 to the vehicle drive shaft 28 via the reduction gear 26. ICE 22 then stops. The drive shaft of the second MG 34 is also connected to the vehicle drive shaft 28 via the transmission 36. Then, the first MG 18 and the second MG 34 are driven by electric power from the battery 12, and HEV 10 travels using power from both MGs. The battery 12 is in the discharging state to obtain required drive power. In a "normal state" of the second EV travel mode, reduction gear ratio A may be selected in transmission 36, while in a "high-speed state" of the second EV travel mode, reduction gear ratio B is selected.

In accordance with an engine power generation mode, ICE 22 is driven, the first MG 18 generates electric power, and the second MG 34 is used for traveling. Clutch 24 connects the drive shaft of the first MG 18 to ICE 22 via the reduction gear 20. ICE 22 is driven/operated, allowing the first MG 18 to generate electric power. The second MG 34 is operated to drive the vehicle drive shaft 28 via the transmission 36. If the amount of power generated by the first MG 18 is greater than the amount of electric power required for the second MG 34, the battery 12 is charged with surplus electric power. If the amount of power generated by the first MG 18 is smaller than the amount of electric power required for the second MG 34, electricity is discharged from the battery 12. Again, reduction gear ratio A is selected in the transmission 36 for use in a normal state, while the reduction gear ratio B is selected for use in a high-speed state.

In regeneration mode, regenerative braking is performed during deceleration of HEV 10 to charge the battery 12 with generated electric power. Both the first MG 18 and the second MG 34 can be utilized as a generator in regeneration mode. For example, the second MG 34 may be utilized to generate electric power, wherein the first MG 18 is stopped, and the clutch 24 is connected to ICE 22 via the reduction gear 20 or is set to the neutral position. The transmission 36 selects one of the reduction gear ratios A or B (depending on which provides more efficiency). Power from the wheels 32 is input to the second MG 34 via the vehicle drive shaft 28 and the transmission 36, and the battery 12 is charged with electric power generated by the second MG 34, via the second inverter 16.

In another configuration, both the first MG 18 and the second MG 34 are utilized to regenerate electric power. In this configuration, clutch 24 connects the drive shaft of the first MG 18 to the vehicle drive shaft 28 via the reduction gear 26. The transmission 36 selects reduction gear ratio A or B, depending on efficiency. Power from the wheels 32 is input, via the vehicle drive shaft 28, to the reduction gear 26 and the first MG 18, as well as to the transmission 36 and the second MG 34. Thus, the battery 12 is charged with electric power generated by both the first MG 18 and the second MG 34.

In another configuration, the first MG 18 is utilized to regenerate electric power. In this configuration, the second MG 34 is stopped, and the clutch 24 connects the drive shaft of the first MG 18 to the vehicle drive shaft 28 via the reduction gear 26. The transmission 36 is set to the neutral position because it does not transmit power. Power from the wheels 32 is input to the first MG 18 via the vehicle drive shaft 28 and the reduction gear 26, and the battery 12 is charged with electric power generated by the first MG 18, via the first inverter 14.

In yet another configuration, the second MG 34 is utilized to regenerate electric power. In this configuration, ICE 22 is driven, and the first MG 18 generates electric power by connecting ICE 22 to the drive shaft of the first MG 18 by the clutch 24. The battery 12 is charged with generated electric power. The transmission 36 may use either of the reduction gear ratios A or B. It should be noted that the first MG 18 cannot engage with both the vehicle drive shaft 28 and the ICE 22 simultaneously.

Returning to ECU 38, ECU 38 may include a microcomputer that includes a CPU, a RAM, a ROM, an input-output interface, and the like. In ECU 38, the CPU utilizes a temporary storage function of the RAM to perform signal processing according to a program in advance stored in the ROM. Accordingly, the ECU 38 executes various kinds of control such as drive control of ICE 22, drive control of MGs 18 and 34, speed change control of transmission 36, engagement force control of clutches 36a and 24, and the like. The ECU 38 may be separately configured with a plurality of control devices such as for control of Ice 22, control of MGs 18 and 34, control of the transmission 36, etc. according to necessity and may execute each control through communication of information with each other. In this embodiment, the ECU 38 corresponds to the control device of HEV 10.

As shown in FIG. 1A, the ECU 38 is supplied with various kinds of input signals detected by each sensor provided in HEV 10. For example, ECU 38 may receive signals that indicate an accelerator operation amount $A_{CC}$, a revolution speed $N_E$ of ICE 22 (engine revolution speed), rotational speeds $N_{MG1}$ and $N_{MG2}$ of the MGs 18 and 34, respectively (motor rotational speed), a vehicle speed V, and energy storage amount (remaining capacity, charged amount), e.g., battery SOC of battery 12. It should be noted that more signals indicative of other operational aspects of HEV 10 can be received by ECU 38, e.g., a temperature of MGs 18 and/or 34, coolant temperature of HEV 10, intake air amount of ICE 22, etc.

ECU 38 can receive the input signals from various sensors 52 configured to sense relevant operational characteristics of HEV 10. For example, accelerator operation amount $A_{CC}$ can be detected by an accelerator stroke sensor that determines the degree to which an accelerator pedal is depressed/actuated. For example, brake operation amount B can be detected by a brake pedal stroke sensor. For example, engine revolution speed $N_E$ can be detected by a crank position sensor. The motor rotational speed $N_{MG1}/N_{MG2}$ can be detected by a motor rotational speed sensor. Vehicle speed V can be detected or calculated by averaging wheel speed or output shaft speed determined by wheel or output shaft sensors. Battery SOC can be calculated by measuring voltage. Another example of a sensor 52 may be a positioning or location sensor, such as a Global Positioning System (GPS) receiver that can provide location information corresponding to a location of HEV 10.

Still another example of a sensor 52 may be a 3-axis accelerometer. The 3-axis accelerometer can be used to determine acceleration of HEV 10, as well as, e.g., the tilt experienced by HEV 10 while being driven. In accordance with various embodiments, the acceleration of HEV 10 determined by the 3-axis accelerometer can send a control signal(s) to ECU 38 indicative of the current rate of acceleration. In some embodiments, the 3-axis accelerometer can be utilized to determine a gradient of a road being traveled by HEV 10, rather than ECU 38 receiving road gradient information from, e.g., a navigation information service provider described below. In some embodiments, road grade can impact operation of MGs 18/34 and/or ICE 22, this impact being reflected in the power usage split display alluded to above, and described in greater detail below.

In some embodiments, one or more of the sensors 52 may include their own processing capability to compute the results for additional information that can be provided to ECU 38. In other embodiments, one or more sensors may be data-gathering-only sensors that provide only raw data to ECU 38. In further embodiments, hybrid sensors may be included that provide a combination of raw data and processed data to ECU 38. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Additionally, ECU 38 can receive input signals from a network interface device 48. Network interface device 48 may receive information such as map data, road conditions information (e.g., upcoming road slope/gradient information, upcoming turn information, etc.), traffic information, and the like from one or more information service providers. Instead of relying solely on a GPS receiver, a location of HEV 10 may be determined from information received by network interface device 48.

ECU 38 can supply various output signals to one or more devices/components/elements provided in HEV 10. For example, the ECU 38 can supply signals to ICE 22 to effectuate drive control of ICE 22. ECU 38 can supply signals to inverters 14 and 16 for effectuating drive control of first and second MGs 18 and 34. ECU 38 can supply signals to a plurality of electromagnetic control valves in a hydraulic control circuit for speed control of the transmission 36. ECU 38 may supply signals to a linear solenoid for engagement control of the clutches 24 and 36a.

Figure 1B:
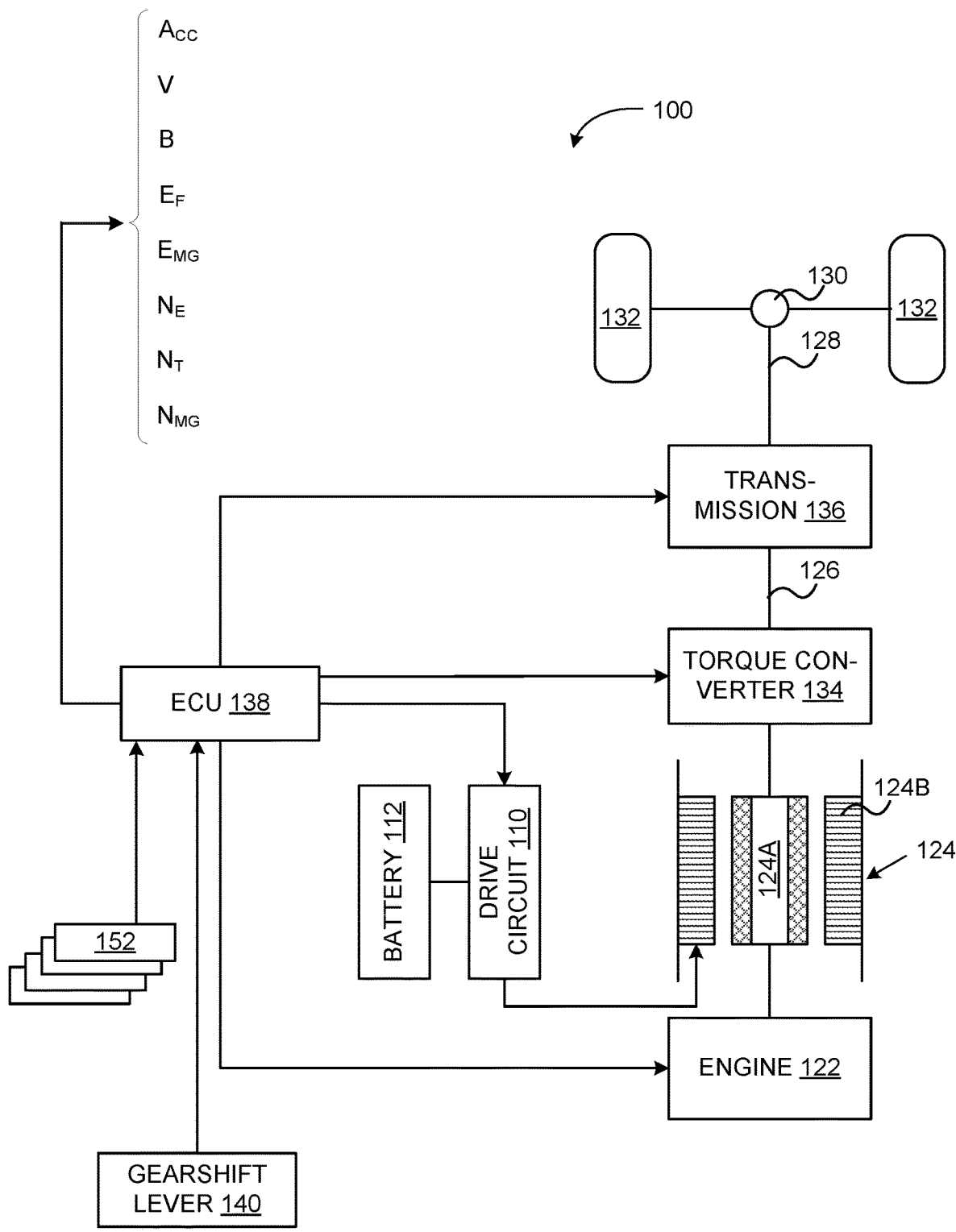
FIG. 1B is a schematic representation of an example single-motor, series HEV, the operating conditions of which can be displayed in accordance with various embodiments of the present disclosure.

FIG. 1B shows a structure of another example HEV (a series, single motor HEV), i.e., HEV 100, in which various embodiments of the present disclosure may be implemented to present power usage split and battery SOC information. HEV 100 may have an ICE 122 and an MG 124 as the power source(s) thereof. A power system of HEV 100 of this embodiment includes ICE 122, motor 122, a torque converter 134, and a transmission 138 that are connected in series. More specifically, the MG 124 is linked with a crankshaft 114 of the ICE 122, whereas a rotating shaft 116 of the MG 124 is linked with the torque converter 134. An output shaft 118 of the torque converter 134 is linked with the transmission 136. An output shaft 120 of the transmission 136 is linked with an axle 128 via a differential gear 130. Right and left wheels may be attached to axle 128, and provided motive force via transmission 136.

ICE 122, like engine 22 (FIG. 1A), may be an ICE. ICE 122 may include a mechanism for regulating the open and close timings of an intake valve (not shown), which causes a gaseous mixture of gasoline and the air to be sucked into a cylinder (not shown), and an exhaust valve (not shown), which causes the hot combustion exhaust to be discharged from the cylinder, relative to vertical movements of a piston (not shown). This mechanism may be referred to as a variable valve timing (VVT) mechanism, and is known in the art, and thus not described in great detail. The VVT mechanism regulates the open and close timings of the intake and exhaust valves to delay the actual closing operations of the respective valves relative to the vertical movements of the piston, thereby reducing the pumping loss of the ICE 122. This results in decreasing the braking force by engine brake. The VVT mechanism also reduces the torque to be output from the MG 124 in the course of motoring the ICE 122. The VVT mechanism controls the open and close timings of the respective valves to attain the highest combustion efficiency according to the speed of the ICE 122 in the process of outputting power through combustion of gasoline.

MG 124 may be, e.g., a three-phase synchronous motor, which includes a rotor 124A with a plurality of permanent magnets attached on the circumferential face thereof, and a stator 124B with three-phase coils wound thereon to generate a revolving magnetic field. The MG 124 is driven to rotate by the interaction between the magnetic field generated by the permanent magnets attached to the rotor 124A and the magnetic field generated by the three-phase coils wound on the stator 124B. When the rotor 124A is rotated by an external force, the interaction between these magnetic fields causes an electromotive force between both ends of the three-phase coils. A sine wave polarized motor, in which the magnetic flux density between the rotor 124A and the stator 124B is distributed in the form of a sine function in the circumferential direction, is applicable for the MG 124. A non-sine wave polarized motor that can output a relatively large torque is, however, applied for the MG 124 in this embodiment.

The stator 124B is electrically connected to a battery 112 via a driving circuit 110. The driving circuit 110 is constructed as a transistor inverter that may include plural pairs of transistors, one as a source and the other as a sink, provided respectively for the three phases of the MG 124. As illustrated in FIG. 1B, the driving circuit 110 is electrically connected to a control unit 138, which may be an ECU. ECU 138 carries out PWM (pulse width modulation) control of the on- and off-time of the respective transistors included in the driving circuit 110. The PWM control causes quasi three-phase alternating currents to be output from the battery 112 as the power source and flow through the three-phase coils of the stator 124B, so as to generate a revolving magnetic field. The MG 124, like MGs 18, 34 (FIG. 1A) functions either as a motor or a generator depending on the revolving magnetic field.

The torque converter 134 may be a known power transmission mechanism. The input shaft of the torque converter 134, that is, the output shaft 116 of the MG 124, is not mechanically linked with the output shaft 118 of the torque converter 134, so that the input and output shafts 116 and 118, respectively, of the torque converter 134 are rotatable in the presence of a slide. A turbine with a plurality of blades is attached to the input and output shafts 116 and 118 of the torque converter 134. The turbines set on the input and output shafts 116 and 118 are arranged to face each other in the torque converter 134. The torque converter 134 has a sealed structure that is filled with transmission oil. The transmission oil works on the respective turbines, so that power is transmitted from one rotating shaft to the other rotating shaft. Since these rotating shafts are rotatable in the presence of a slide, the power input from one rotating shaft is converted to a different combination of revolving speed and torque and transmitted to the other rotating shaft.

The transmission 136 may include a plurality of gear units, clutches, one-way clutches, and brakes and changes the gear ratio, so as to enable the power input from the output shaft 118 of the torque converter 134 to be converted to a different combination of torque and revolving speed, and transmitted to the output shaft 120 of the transmission 136. Further still, a gearshift lever 140 provides a mechanism that allows a user/operator of HEV 100 to shift between the various gears of transmission 136. Moreover, similar to HEV 10 of FIG. 1A, HEV 100 may also include one or more sensors 152 that allow various operating conditions and/or characteristics of HEV 100 to be monitored, obtained, and/or output to/obtained by ECU 138. These sensors 152 may be the same or similar to sensors 52 described above with respect to FIG. 1A.

Figure 2:
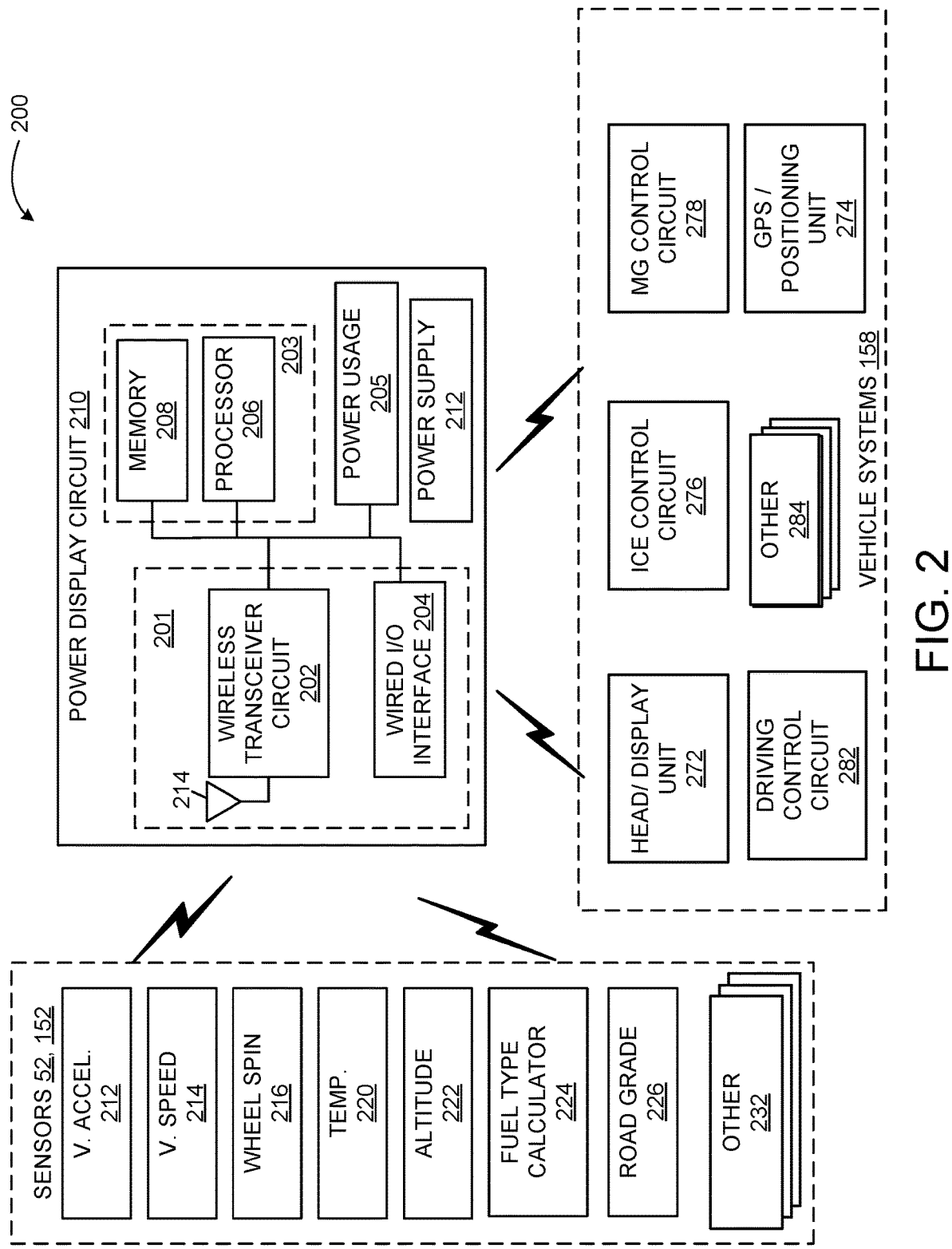
FIG. 2 is a schematic representation of an example architecture for implementing battery SOC and power split usage display in the example HEV illustrated in FIG. 1.

FIG. 2 illustrates an example architecture for implementing a power display in accordance with various embodiments. Referring now to FIG. 2, in this example, power display system 200 may include a power display circuit 210, a plurality of sensors 52, 152, and a plurality of vehicle systems 158. Sensors 52, 152 and vehicle systems 158 can communicate with power usage circuit 210 via a wired or wireless communication interface. Although sensors 52, 152 and vehicle systems 158 are depicted as communicating with power display circuit 210, they can also communicate with each other as well as with other vehicle systems. Power display circuit 210 can be implemented as an ECU or as part of an ECU such as, for example ECU 38. In other embodiments, power display circuit 210 can be implemented independently of an ECU.

Power display circuit 210 in this example includes a communication circuit 201, a decision circuit 203 (including a processor 206 and memory 208 in this example) and a power supply 212. Components of power display circuit 210 are illustrated as communicating with each other via a data bus, although other communication in interfaces can be included. Power display circuit 210 in this example also includes a power usage component 205 that can determine power allocation and power boundaries, e.g., maximum power that ICE 22, MG 18, and/or MG 34 (of HEV 10) or ICE 122 and MG 124 (of HEV 100) can provide considering various operating conditions, road/environmental conditions, etc.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more memory units of one or more different types of memory, and may be configured to store data and other information as well as operational instructions that may be used by the processor 206 to power display circuit 210.

Although the example of FIG. 2 is illustrated using processor and memory circuitry, as described below with reference to circuits disclosed herein, components such as power usage circuit 205 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a driving mode circuit 210.

Communication circuit 201 may comprise either or both a wireless transceiver circuit 202 with an associated antenna 214 and a wired I/O interface 204 with an associated hardwired data port (not illustrated). As this example illustrates, communications with power display circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by power display circuit 210 to/from other entities such as sensors 52, 152 and vehicle systems 158. Wireless transceiver circuit 202 can be used to provide wireless communications with sensors 52, 152, vehicle systems 158 and components or systems external to the vehicle such as, for example, other vehicles, infrastructure elements, cloud servers, and so on.

Wired I/O interface 204 can include a transmitter and a receiver (not shown) for hardwired communications with other devices. For example, wired I/O interface 204 can provide a hardwired interface to other components, including sensors 52, 152 and vehicle systems 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 52, 152 can include additional sensors that may or not otherwise be included on or in HEV 10, with which the power display system 200 is implemented. In the illustrated example, sensors 52, 152 include vehicle acceleration sensors 212, vehicle speed sensors 214, wheel speed sensors 216 (e.g., one for each wheel), temperature sensors 220 (e.g., one for each wheel), altitude sensors 222 to detect a current altitude at which HEV 10 is operating, road grade sensors 226, which can be embodied as to detect roll, pitch and yaw of the vehicle, fuel type sensors 224 which can detect the type of gas fueling ICE 22 or ICE 122, e.g., octane level. It should be understood (as noted above) that one or more sensors may have their own processors for performing certain calculations to obtain the requisite information. In this instance, fuel type sensor 224 may determine how "well" combustion in ICE 22 or ICE 122 is occurring. If fuel type sensor 224 detects "faulty" or non-ideal combustion, ignition timing may be retarded, which in turn can be a basis for inferring the type of gas being used. Additional sensors 232 can also be included as may be appropriate for a given implementation of power display system 200. These sensors 52, 152 may be used to gather data that can be used to determine how to display power usage.

Vehicle systems 158 can include any of a number of different vehicle components or subsystems used to control or monitor various aspects of the vehicle and its performance. In this example, the vehicle systems 158 include: a head unit or other display unit (e.g., dash display) 272; a GPS or other vehicle positioning system 274; ICE control circuit 276 to control the operation of ICE 22; and an MG control circuit to control the operation of MG 18 and MG 34, or alternatively, a driving control circuit 282 (an embodiment or implementation of driving control 110) to control the operation of ICE 122 and MG 124. It should be understood that each of MGs 18 and 34 may have distinct controllers in other embodiments. Still other vehicles systems 280 may interact with power display circuit 210, sensors 52, 152 and/or other one circuits, units, or components of vehicle systems 158.

As alluded to above, ECU 38 may control the drive power (output torque) of ICE 22, e.g., by way of a throttle valve opening of an electronic throttle valve, controlling the amount of fuel supplied by a fuel injection device, the ignition timing of the ignition device, etc. Accordingly, ECU 38 controls the manner in which ICE 22 provides drive power so that engine output required by ICE 22 can be achieved. ECU 138 may control drive power of ICE 122 by way of the aforementioned intake valve.

As noted above, ICE 22, 122 can be driven in various modes and/or states of travel. Moreover, the amount of drive power that ICE 22, 122 can provide to propel HEV 10 or HEV 100, respectively, may vary depending on road conditions, environmental conditions, battery SOC, operating conditions or characteristics of HEV 10/HEV 100 and/or an operator of HEV 10/HEV 100, etc. Accordingly, power usage circuit 205 may receive input from one or more sensors and/or information sources communicating with power usage circuit 205.

Power usage circuit 205 may determine what, if any, conditions or characteristics may impact the amount of power/torque that ICE 22, 122 can provide. Power usage circuit 205 may analyze this information and determine a maximum (and minimum if other than zero power/torque) amount of power that ICE 22, 122 can currently deliver. For example, power usage circuit 205 may receive temperature information from temperature sensor 220. The temperature information may be ambient temperature, temperature near/at ICE 22, 122 or both. Power usage circuit 205 may execute one or more algorithms or may access information, e.g., stored in memory 208, correlating engine temperature and/or ambient temperature to the amount of drive power that can be provided by ICE 22 or 122 when operating in or at such temperatures. Generally, an engine will not operate at its fullest capacity in extremely hot or cold environments.

For example, the use of air conditioning in HEV 10, 100 may lower the drive power available from ICE 22, engine 122. That is, HEV 10's/HEV 100's heating ventilation and air conditioning (HVAC) system may be powered by ICE 22 and 122, respectively. Accordingly, operating the HVAC system of HEV 10 or 100 may pull energy from ICE 22 or 122, respectively, lowering its maximum power output. In some embodiments, HEV 10 and HEV 100 may have a relay that shuts off air conditioning in a wide open throttle condition to ensure ample power is available for hard acceleration. Accordingly, a hard acceleration condition may result in the maximum amount of power available from ICE 22 or 122 increasing temporarily.

As another example, the basis on which ICE 22, 122 operates is igniting fuel, and the efficiency with which ICE 22, 122 operates can vary depending, e.g., on how much oxygen and how much fuel (and/or the type of fuel) is present in a cylinder in which the ignition occurs. It should be noted that many other factors/variables may affect ICE 22, 122 operation. At higher altitudes, air is less dense and less oxygen is present than at lower altitudes, e.g., at sea level. Accordingly, ICE 22 or ICE 122 cannot operate as efficiently, and may not provide the same amount of drive power as it would at lower altitudes. For example, naturally aspirated engines may experience power loss on the order of, e.g., one to three percent for every 1000 ft. of elevation. Turbocharged or supercharged engines may experience less power loss, but the amount of loss can be heavily dependent on the specific characteristics of the turbocharger/supercharger. Below is an example table reflecting median power loss of a 300 HP engine at different elevations.

| Power (HP) | Power Reduction | Elevation (FT) |
| --- | --- | --- |
| 300 | 1 | 0 |
| 294 | 0.98 | 1000 |
| 288 | 0.96 | 2000 |
| 282 | 0.94 | 3000 |
| 276 | 0.92 | 4000 |
| 270 | 0.9 | 5000 |
| 264 | 0.88 | 6000 |
| 258 | 0.86 | 7000 |
| 252 | 0.84 | 8000 |
| 246 | 0.82 | 9000 |
| 240 | 0.8 | 10000 |
| 234 | 0.78 | 11000 |
| 228 | 0.76 | 12000 |
| 222 | 0.74 | 13000 |
| 216 | 0.72 | 14000 |

Upon power usage circuit 205 determining the maximum and minimum available power given the relevant conditions or characteristics currently applicable to HEV 10, 100, power display circuit 210 may transmit this information to head unit/display unit 272 for presentation. Moreover, these operating boundaries may be communicated to ICE control circuit 276 or driving control circuit 282. For example, when operating in the aforementioned extreme conditions, the operating boundaries may equate to limits that are placed on ICE 22, 122. In other words, ICE 22, 122 may, in theory, be able to operate up to true 100% output, but the ICE control circuit 276 or driving control circuit 282 may be instructed to limit the operation of ICE 22, 122 to some lower output power, e.g., the aforementioned 80%. In this way, the power usage information determined by power usage circuit 205 of power display circuit 210 may be used to protect the powertrain of HEV 10, 100. In other cases, information regarding ICE 22, 122 may be transmitted from ICE control circuit 276 or driving control circuit 282 to power usage circuit 205, allowing power usage circuit 205 to ascertain and provide relevant operating information (e.g., feedback) that may impact ICE 22's/ICE 122's performance, which can then be reflected to an operator (or other passenger) of HEV 10, 100.

Further still, it should be understood that because battery 12 powers MGs 18 and 34, the battery SOC can impact the operation of MGs 18 and/or 34. The same is true of battery 112 that powers MG 124. For example, due to temperature conditions, HEV 10, 100 may need to rely more on MG 18 and/or 34 or MG 124, which in turn drains the battery 12 or 112 more quickly than may be expected. Additionally, if the battery SOC is very low, and/or the temperature of the battery is such that it is too hot to recharge, MG 18 and/or 34 or MG 124 may cause additional drag on the drivetrain resulting in some parasitic loss. As another example, if the battery SOC of a battery is relatively low, the battery may not be able to provide enough electrical energy or power to drive one or more motors to produce their standard, maximum output torque. In some situations, the battery SOC may be affected by regenerative braking. That is, using HEV 10 as an example, HEV 10 may be operating in a regenerative braking mode, where (as discussed above), power from the vehicle drive shaft 28 is transmitted to the second MG 34, thereby allowing second MG 34 to generate electric power can be generated in the second MG 34. In such a scenario, MG 34 may not be available for use in a high-speed state travel mode (where normally, both first and second MGs 18 and 34 are driven to provide high acceleration). Accordingly, without information regarding battery SOC and available power of MGs 18 and 34, a user may not understand why HEV 10 is not responding to a high acceleration request.

An MG control circuit 278 may control actuation of either or both MGs 18 and 34 via inverters 14 and 16. Specifically, electric energy is supplied from battery 12 to MGs 18 and/or 34 via inverters 14 and/or 16, respectively. MG control circuit 278 may also output a control signal(s) for driving one or more of MGs 18 and 34 to rotate and generate positive or negative motor torque to obtain the output required of MG 18 and/or 34 (depending on the operator and operating/road/environmental conditions impacting HEV 10). Similarly, driving control circuit 282 may control actuation of MG 124, whereby electric energy is supplied from battery 112 to MG 124. Driving control circuit 282 may also output a control signal(s) for driving MG 124 to rotate and generate positive or negative motor torque to obtain the output required of MG 124.

Power usage circuit 205 may transmit information or instructions to MG control circuit 278 so that operation of MG 18 and/or 34 may be controlled (or similarly to driving control circuit 282 so that operation of MG 124), e.g., limited, under certain operating conditions or circumstances. MG control circuit 278 or driving control circuit 282 may provide feedback to power usage circuit 205 regarding MG 18 and/or 34 or MG 124.

In some embodiments, GPS/positioning unit 274 may provide information regarding current road conditions, e.g., road grade, traffic, etc. based on the current location of HEV 10, 100. Accordingly, GPS/positioning unit 274 may provide information about one or more factors that may impact the performance of ICE 22, 122, battery SOC, and/or one or more of MGs 18 and 34/MG 124. GPS/positioning unit 274 may have or receive maps or map information indicative of the route to be traveled along with road conditions, e.g., any uphill and/or downhill gradients present/expected along the route.

For example, power usage circuit 205 may ascertain that HEV 10, 100 is traveling a section of roadway that includes some amount of uphill travel. As alluded to above, road grade can impact the performance of, e.g., MGs 18 and 34 or MG 124 as they may have to generate and use extra drive power to propel HEV 10, 100 uphill. Battery 12, 112 may be depleted more quickly than if HEV 10, 100 was traversing a flat section of roadway, ICE 22, 122 may be used to augment MG 18 and/or MG 34 or MG 124, respectively, etc. If traveling uphill, the current altitude of HEV 10, 100 may increase to a level such that air density begins to impact operation of ICE 22, engine 122 (as noted above). Any one or more of these circumstances and their resulting impact on the powertrain of HEV 10, 100 may be presented via head/display unit 272 vis-à-vis power display circuit 210.

It should be understood that the above examples are not meant to be limiting. Other factors, conditions, characteristics, etc. may impact the operation of ICE 22 and/or one or more of MGs 18 and 34, and ICE 122 and MG 124. In some cases, the operation of one powertrain component can impact the operation of another. For example, and as described above, the battery can impact motor operation, which can impact engine operation. Such factors, conditions, characteristics, etc. may be studied or analyzed (or known from previous experience) to determine their impact (alone or in some combination thereof) to the operation of ICE 22 and/or one or more of MGs 18 and 34 or the operation of ICE 122 and MG 124. This impact can be reflected when presenting a display of the power usage information by power display circuit 210.

Power display circuit 210 may communicate the relevant information regarding power usage and battery SOC information to head/display unit 272 for presentation to an operator or other passenger of HEV 10, 100. It should be understood that the presentation of this information can be implemented on any display or display mechanism utilized in HEV 10, 100. For example, the dash display of HEV 10, 100 may accommodate the presentation of such information. For example, HEV 10, 100 may utilize a heads-up display that can accommodate the presentation of such information. In some embodiments, this information can be presented on or through one or more displays of HEV 10, 100.

Figure 3:
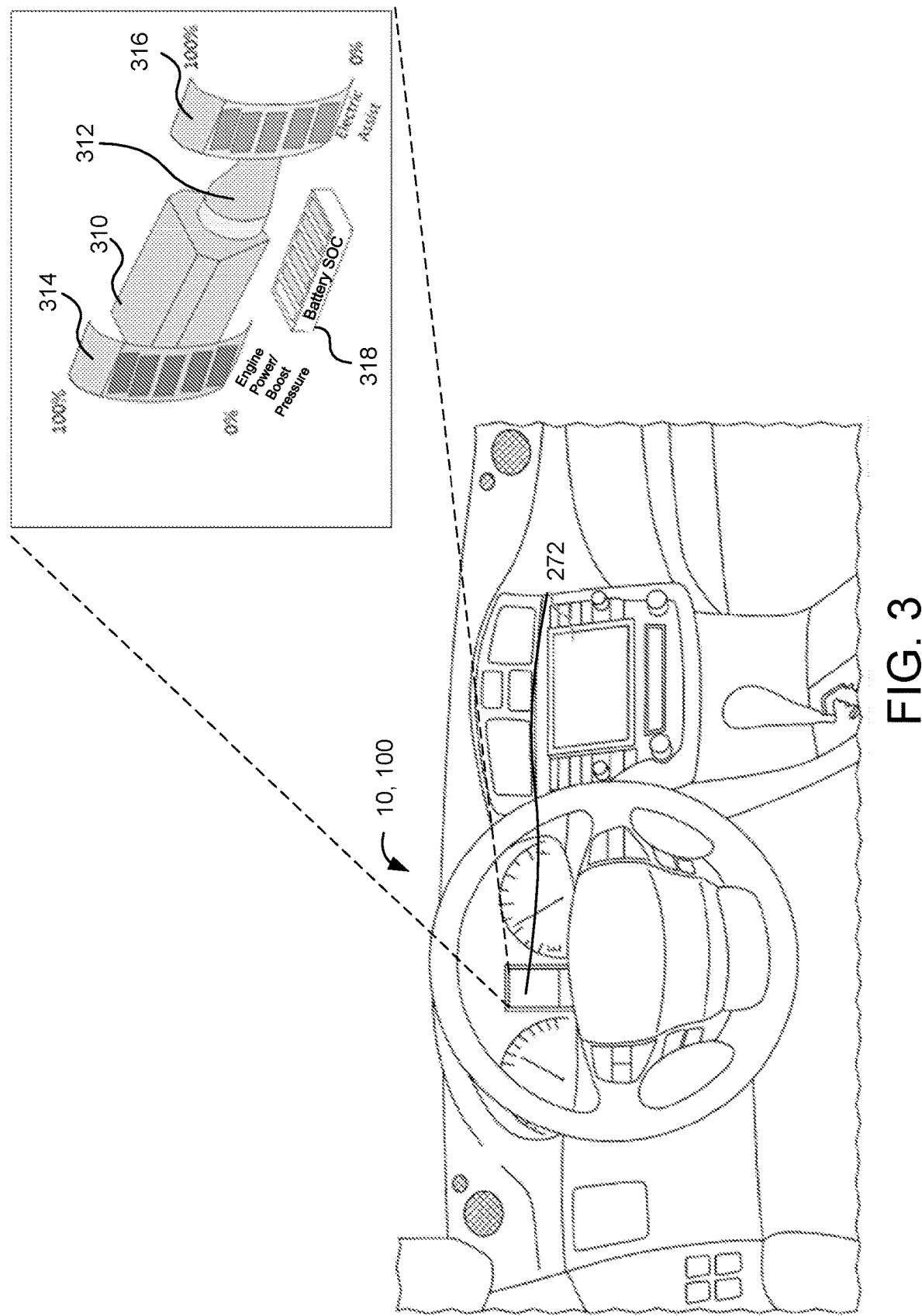
FIG. 3 illustrates an example display that can be presented to an operator in an HEV.

Referring now to FIG. 3, an example presentation of power usage split and battery SOC information is illustrated. As shown in FIG. 3, the interior of HEV 10, 100 may include a head unit or other display 272 (e.g., on the dashboard) through which battery SOC and power usage split information may be presented. The presentation of information may include a background image or representation of HEV 10's or HEV 100's powertrain. In this example, the background image may comprise a representation of an ICE 310, e.g., ICE 22, 122, in series with a representation of an MG 312 that can refer to MG 18 and/or MG 34 or MG 124. It should be understood that in other embodiments, two representations corresponding to each of MG 18 and MG 34 may be displayed. Here, MG 18 and MG 34 are represented together. In other embodiments, if HEV 10 utilizes only one of MG 18 or MG 34 for drive power, the presentation can reflect a singular MG. As HEV 100 includes only a single motor, the representation of an ICE 310 corresponds to MG 124.

The representation of an ICE 310 may have a corresponding power bar representation 314 that reflects maximum and minimum drive power that can be provided by ICE 22, 122. As noted above, in some embodiments boost pressure information can be presented. It should be understood that except for, e.g., initial application of the pedal, engine power is directly related to boost pressure, thus power bar representation 314 could also represent boost pressure. In some embodiments, the appropriate units may also be displayed, e.g., horsepower/kW (engine power) or PSI/kPa (boost pressure). Similarly, the representation of an MG 312 may have its own corresponding power bar representation 316 that reflects maximum and minimum drive power that can be provided by MG 18 and/or MG 34 (as appropriate in view of the powertrain configuration of HEV 10) or MG 124 of HEV 100. Additionally, battery SOC information can be presented in a battery SOC representation 318. Battery SOC representation 318, in this embodiment, is presented proximate to the representations 314 and 316. The proximate location of battery SOC representation 318 allows an operator or passenger of HEV 10, 100 to visually understand the relationship between battery SOC and the operation of ICE 22, MG 18, and/or MG 34, or ICE 122 and MG 124.

As noted above, the maximum (or minimum) available power that ICE 22, MG 18, and/or MG 34, or ICE 122 and MG 124 can currently provide may be represented as a scale, in the example of FIG. 3, a scale from 0% to 100%. In some embodiments, the maximum or minimum available power is adjusted based on one or more of the aforementioned factors, conditions, or characteristics of HEV 10, 100. For example, at a certain point of operation, the maximum available power from ICE 22 or ICE 122 may be 80% of its "standard" maximum available power due to current altitude, temperature, etc. In one embodiment, the maximum available power will be set to 80%. In another embodiment, any decrease or increase in maximum or minimum available power, respectively, can be taken into account, but the presentation of available power appears as a range from 0% to 100%, e.g., the presentation of maximum or minimum available power can be scaled relative to the relevant factors, conditions, and/or characteristics of HEV 10, 100. A series of bars or other indicators may be used within or as part of the representations 314 and 316 to display ICE-supplied and MG-supplied power relative to the displayed maximum and minimum available representations.

It should be understood that the example presentation illustrated in FIG. 3 is not meant to be limiting. In some embodiments, the representations 314 and 316 may appear or may be highlighted only when the corresponding component of the powertrain is currently providing drive power. For example, an operator of HEV 10, 100 may implement an EV travel mode that only relies on drive power from MG 18 and/or MG 34, or MG 124. Accordingly, the presentation of power usage split and battery SOC information may only include representation 316 (until ICE 22 is used or can be used to augment the drive power provided by MG 18 and/or MG 34/until ICE 122 is used or can be used to augment the drive power provided by MG 124).

In other embodiments, this presentation may be adjusted or altered to indicate particular driving modes. For example, an operator of HEV 10, 100 may select a particular driving mode, such as a sport driving mode or tow mode. In a sport driving mode, HEV 10, 100 may rely more heavily on ICE 22, 122 to provide drive power, in which case, the presentation may highlight or otherwise focus more on representation 314, letting the operator of HEV 10, 100 know he/she may experience a drop in fuel efficiency, for example. Such a presentation may also be useful to an operator of HEV 10, 100 inasmuch as the presentation can indicate to the operator how frequently particular components of the powertrain are being used and to what extent. In other cases, the operator may determine or HEV 10, 100 may determine a need to switch from an EV travel mode to an HEV travel mode or to an ICE-only travel mode. The presentation of power usage split and battery SOC can reflect such changes accordingly.

In still other embodiments, power display circuit 210 can provide suggested or recommended power usage splits via the presentation of power usage and battery SOC. For example, current power usage and battery SOC information may be presented along with additional indicators that suggest "optimal" power usage splits for optimum fuel efficiency, for optimum battery power preservation, and/or for any other relevant or desired operating condition or characteristic. In other embodiments, the optimal power split may be determined via manufacturer-based vehicle calibration, and that optimal power split may simply be implemented.

It should be noted that the terms "optimize," "optimal" and the like as used herein can be used to mean making or achieving performance as effective or perfect as possible. Moreover, techniques disclosed herein can refer to, e.g., performing calculations, etc. that result in "more accurate" determinations. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 4:
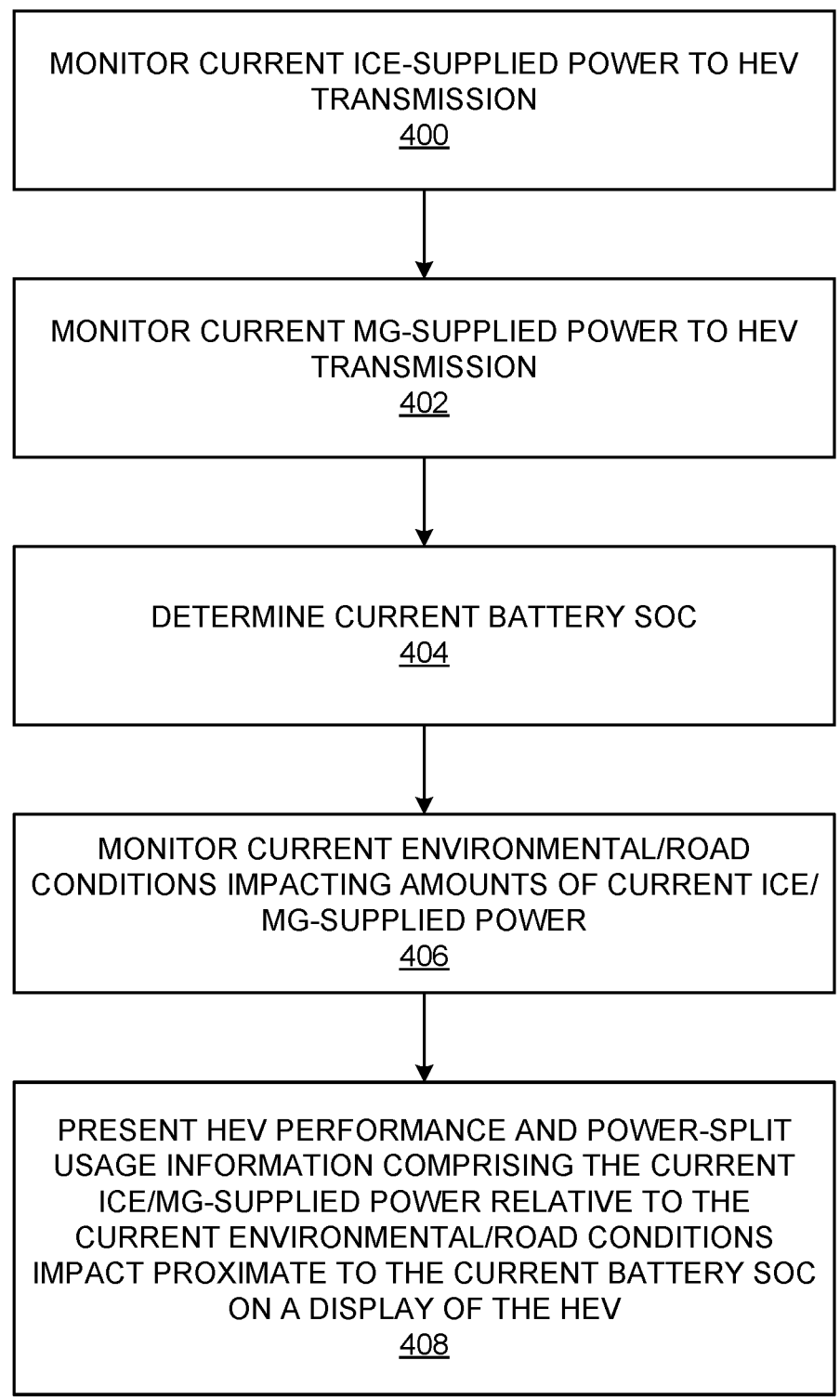
FIG. 4 is a flow chart illustrating example operations that can be performed to determine and display battery SOC and power split usage in accordance with various embodiments of the present disclosure.

FIG. 4 is a flow chart illustrating example operations that may be performed to present power usage split and battery SOC information in accordance with various embodiments of the present disclosure. At operation 400, current ICE-supplied power to an HEV transmission is monitored. As discussed above, a power display circuit 210 may include a power usage circuit 205 that can exchange information with an ICE control circuit 276 or driving control circuit 282. Current ICE-supplied power can be obtained by interacting with ICE control circuit 276. In other embodiments, one or more sensors may be used to monitor and gather information regarding the amount of power being supplied by ICE 22, 122. The frequency with which the monitoring is performed can vary, but the more frequently that information is exchanged, generally the more accurate/up-to-date the ICE-supplied power information.

At operation 402, current MG-supplied power to an HEV transmission is monitored. As discussed above, a power display circuit 210 may include a power usage circuit 205 that can exchange information with an MG control circuit 278 or driving control circuit 282. Current ICE-supplied power can be obtained by interacting with MG control circuit 278 or driving control circuit 282. In other embodiments, one or more sensors may be used to monitor and gather information regarding the amount of power being supplied by MG 18 and/or MG 34, or MG 124. The frequency with which the monitoring is performed can vary, but the more frequently that information is exchanged, generally the more accurate/up-to-date the MG-supplied power information.

At operation 404, a current battery SOC is determined. As described above, battery 12 of HEV 10 or battery 112 of HEV 100 can be monitored and SOC information regarding battery 12, 112 can be obtained by power display circuit 210.

At operation 406, current environmental and/or road conditions impacting amounts of current ICE and/or MG-supplied power can be monitored. As noted above, various factors, conditions, and/or characteristics of HEV 10, 100, the environment in which HEV 10, 100 is operating, etc. can have an effect on the operation of one or more powertrain components. Power display circuit 210 can calculate or access information correlating performance of the one or more powertrain components. In this way, the presentation of power usage split information can accurately reflect power usage and maximum and/or minimum available power from the powertrain components, e.g., ICE 22, MG 18, and/or MG 34, or ICE 122 and MG 124.

At operation 408, HEV performance and power-split usage information comprising the current ICE and MG-supplied power relative to the current environmental/road conditions are presented proximate to a current battery SOC on a display of the HEV. As described above with reference to FIG. 3, there are various ways to display this information. The presentation of this information, and the manner in which this information is presented can aid an operator or passenger in understanding how and/or why a vehicle is operating in a particular manner, e.g., not responding to a request for added ICE power, lack of response from one or more MGs, whether or not a particular route or portion of road necessitates a certain power split, etc.

Figure 5:
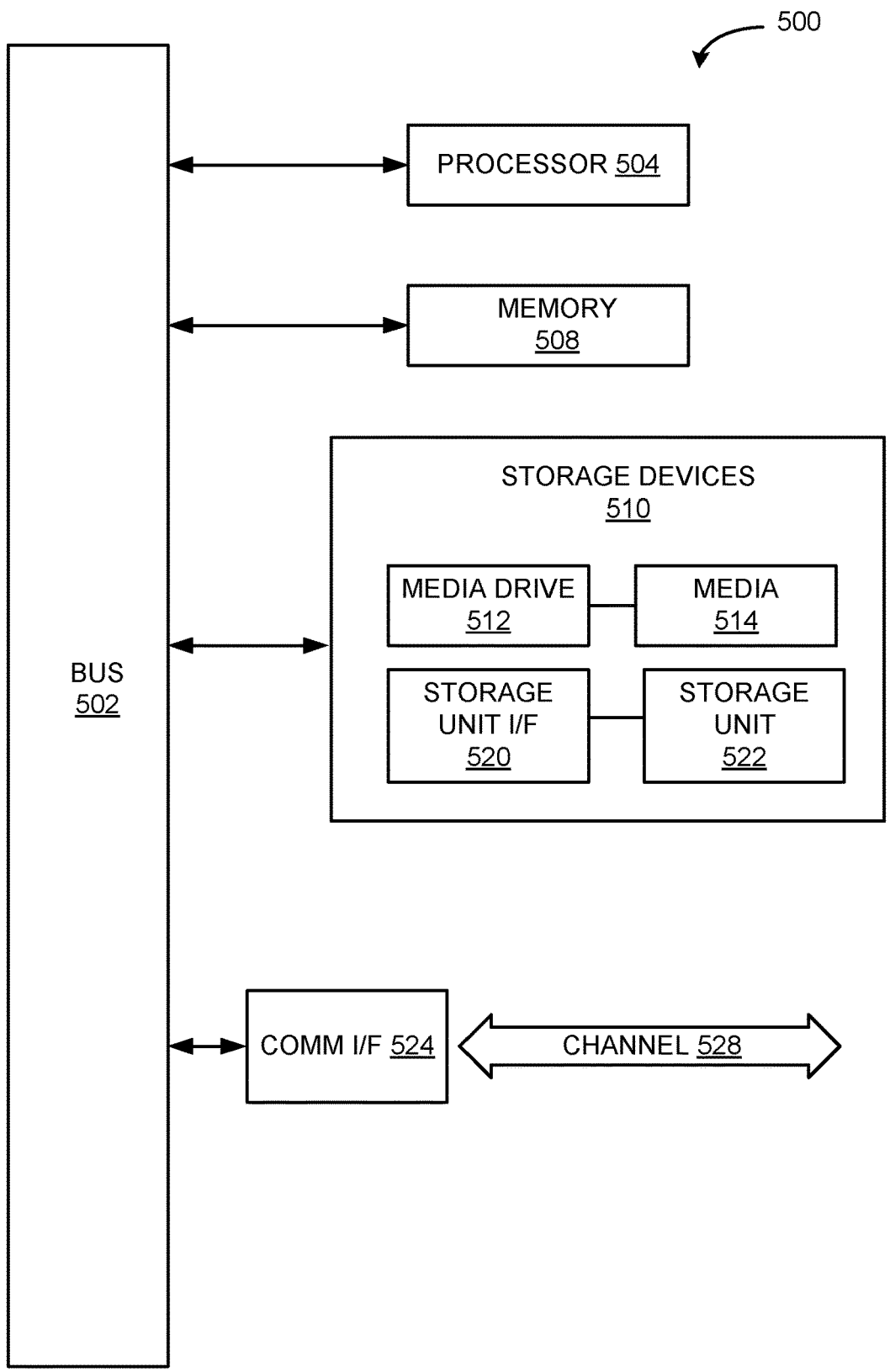
FIG. 5 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example—computing component 500. After reading this description, it will become apparent to a person skilled in the relevant art how to implement the application using other computing components or architectures.

Referring now to FIG. 5, computing component 500 may represent, for example, computing or processing capabilities found within computer processing units or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, electronic devices that might include some form of processing capability.

Computing component 500 might include, for example, one or more processors, controllers, control components, or other processing devices. This can include a processor, and/or any one or more of the components making up electronic control device 50 and/or its component parts, hydraulic control circuit 40, or other components or elements of vehicle, e.g., signal sensors, etc. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
monitoring current engine-supplied power to a hybrid electric vehicle transmission;
monitoring current motor generator-supplied power to the hybrid electric vehicle transmission;
determining a current battery state of charge;
monitoring an impact of at least one of current environmental conditions and road conditions on the amounts of the current engine-supplied power and the current motor generator-supplied power; and
presenting hybrid electric vehicle performance and power usage split information comprising:
the current engine-supplied power amount;
the current motor generator-supplied power amount relative to the at least one of the current environmental conditions and road conditions impact; and
a presentation of the current battery amount of charge on a display of the hybrid electric vehicle, proximate to the current motor generator-supplied power amount.

2. The method of claim 1, wherein the at least one of the current environmental conditions and road conditions impact is presented as a maximum and minimum available engine-supplied power and as a maximum and minimum available motor generator-supplied power.

3. The method of claim 1, wherein the hybrid electric vehicle comprises a series hybrid electric vehicle.

4. The method of claim 3, wherein the series hybrid electric vehicle comprises a single motor generator operatively connected to a transmission of the hybrid electric vehicle.

5. The method of claim 4, wherein the series hybrid electric vehicle further comprises an engine operatively connected to the single motor generator in series.

6. The method of claim 4, wherein the series hybrid electric vehicle comprises a battery operatively connected to and providing electrical power to the single motor generator.

7. The method of claim 1, wherein the hybrid electric vehicle comprises a parallel hybrid electric vehicle.

8. The method of claim 7, wherein the parallel hybrid electric vehicle comprises first and second motor generators operatively connected to the transmission of the hybrid electric vehicle.

9. The method of claim 8, wherein the parallel hybrid electric vehicle comprises an engine operatively connected in parallel to one of the first and second motor generators.

10. The method of claim 8, wherein the parallel hybrid electric vehicle comprises a battery operatively connected to and providing electrical power to at least one of the first and second motor generators.

11. The method of claim 1, wherein the presentation of the hybrid electric vehicle performance and power usage split information comprising the current engine-supplied power and the current motor generator-supplied power relative to the at least one of the current environmental conditions and road conditions impact is displayed against a background representation of a powertrain of the hybrid electric vehicle.

12. The method of claim 11, wherein the powertrain of the hybrid electric vehicle comprises an internal combustion engine operatively connected to at least one motor generator in series.

13. A hybrid electric vehicle, comprising:
a power display circuit:

monitoring engine-supplied power to a transmission relative to engine-supplied available power;
monitoring motor generator-supplied power to the transmission relative to motor generator-supplied available power;
determining a battery state of charge;
monitoring operating conditions relating to and operating characteristics of the hybrid electric vehicle and impacts of the conditions and characteristics on the amounts of the engine-supplied available power and the motor generator-supplied available power; and
a display:
displaying power usage split information comprising:
   the engine-supplied power amount relative to the engine-supplied available power amount; and
   the motor generator-supplied power amount relative to the motor generator-supplied available power amount; and displaying battery amount of charge information proximate to the power usage split information.

14. The hybrid electric vehicle of claim 13, wherein the hybrid electric vehicle comprises a series hybrid electric vehicle.

15. The hybrid electric vehicle of claim 13, wherein an internal combustion engine generates the engine-supplied power.

16. The hybrid electric vehicle of claim 15, wherein a single motor operatively connected in series to the internal combustion engine generates the motor generator-supplied power.

17. The hybrid electric vehicle of claim 15, wherein a battery operatively connected to the single motor generators provides electrical power to the single motor generator.

18. The hybrid electric vehicle of claim 13, wherein the display displays the power usage split information relative to a representation of the powertrain of the hybrid electric vehicle.

* * * * *